(12) United States Patent
Frankovich, III et al.

(10) Patent No.: US 9,811,253 B2
(45) Date of Patent: Nov. 7, 2017

(54) SYSTEM FOR DRAGGING A DEVICE ONTO A CHART TO PLOT DATA OF ITS SOURCES

(71) Applicant: Honeywell International Inc., Morristown, NJ (US)

(72) Inventors: John Joseph Frankovich, III, Henricko, VA (US); Gareth Johnson, Billingshurst (GB)

(73) Assignee: Honeywell International Inc., Morris Plains, NJ (US)

( * ) Notice: Subject to any disclaimer, the term of this patent is extended or adjusted under 35 U.S.C. 154(b) by 256 days.

(21) Appl. No.: 14/697,606

(22) Filed: Apr. 27, 2015

(65) Prior Publication Data

US 2016/0313887 A1  Oct. 27, 2016

(51) Int. Cl.
G06F 3/048 (2013.01)
G06F 3/0486 (2013.01)
G06F 3/0484 (2013.01)
G06T 11/20 (2006.01)

(52) U.S. Cl.
CPC ........ *G06F 3/0486* (2013.01); *G06F 3/04845* (2013.01); *G06F 3/04847* (2013.01); *G06T 11/206* (2013.01)

(58) Field of Classification Search
CPC .............................. G06F 17/30; G06F 3/0486
See application file for complete search history.

(56) References Cited

U.S. PATENT DOCUMENTS 6,490,500 B1    12/2002  McCulloch
9,239,672 B2    1/2016   Kraut
2014/0040793 A1*  2/2014  Justiza ...................... G06F 8/34
                                                          715/763

OTHER PUBLICATIONS

"How to Drag and Drop New Data on a Chart in Microsoft Excel" published at https://www.youtube.com/watch?v=eTyBGbxzVK4 Jun 23, 2010.*

* cited by examiner

*Primary Examiner* — Peiyong Weng
(74) *Attorney, Agent, or Firm* — Seager, Tufte & Wickhem, LLP

(57) ABSTRACT

A system and approach for dragging an entire device from a navigation tree to a chart which may result in a plotting of all its data sources at once on a chart as provided by a processor. Another source may be added before completion of a loading of a previous source. If there appear too many sources to visualize at once, then one or more sources may be removed from the chart.

24 Claims, 5 Drawing Sheets

SYSTEM FOR DRAGGING A DEVICE ONTO A CHART TO PLOT DATA OF ITS SOURCES

BACKGROUND

The present disclosure pertains to devices, data sources of the devices, and displaying data.

SUMMARY

The disclosure reveals a system and approach for dragging an entire device from a navigation tree to a chart which may result in a plotting of all its data sources at once on a chart as provided by a processor. Another source may be added before completion of a loading of a previous source. If there appear too many sources to visualize at once, then one or more sources may be removed from the chart.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

A device may have multiple sources of historical data. In the past, when one wanted to chart each of the sources of data, generally each of the sources needed to be added one by one. This may require a time consuming repetitive motion of clicking various sources under the same device in order to see multiple sources at once.

For example, a regular VAV (variable air volume) controller (device) may have numerous sources of data like box flow, daily consumption, damper position, demand, power, reheat, space temperature, supply temperature, and weekly consumption. Adding those sources one at a time can take time if each of those sources has a lot of historical data, since one may have to wait extra time for each source of data to be loaded before adding the next source.

By being able to allow an entire device like the VAV controller to be dragged onto a chart, one may get some benefits. One is ease of use in that virtually all the available sources for a device may be plotted at once and be immediately comparable. There may be no waiting for each source to finish loading before loading another source. If there appear too many data points to view, it should be easy to remove or hide the data points that one does not care or need to see.

In a navigation tree, one may navigate to a network of devices and choose a device. Instead of expanding a desired device and choosing the individual points to chart, one may just drag the device itself onto a chart and virtually all the data sources for the chart should be found and shown. If there are too many sources, one may just remove the unwanted ones.

Figure 1:
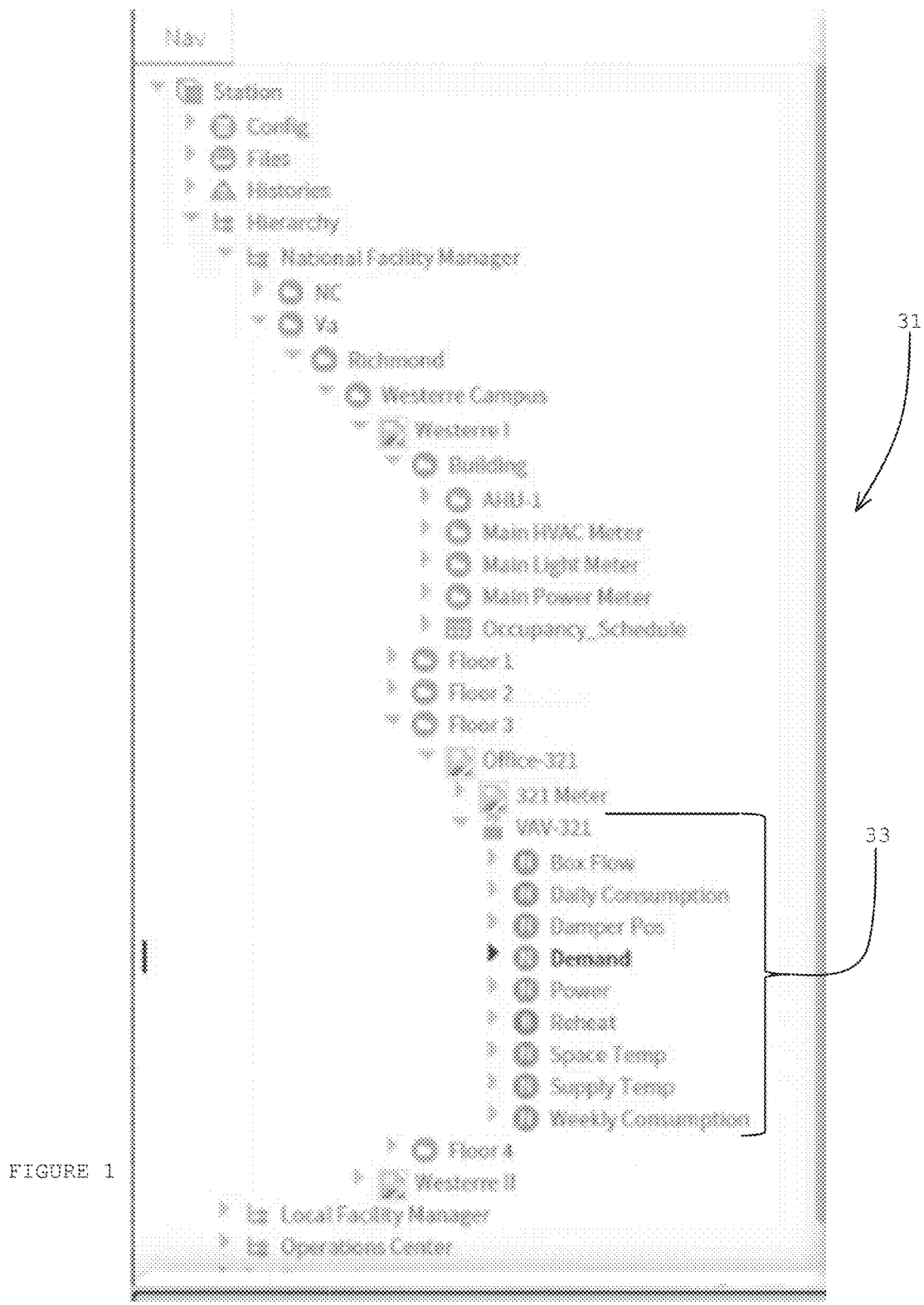
FIG. 1 is a diagram of a navigation tree where an icon of a device may be selected to get information about sources of a component.
Figure 2:
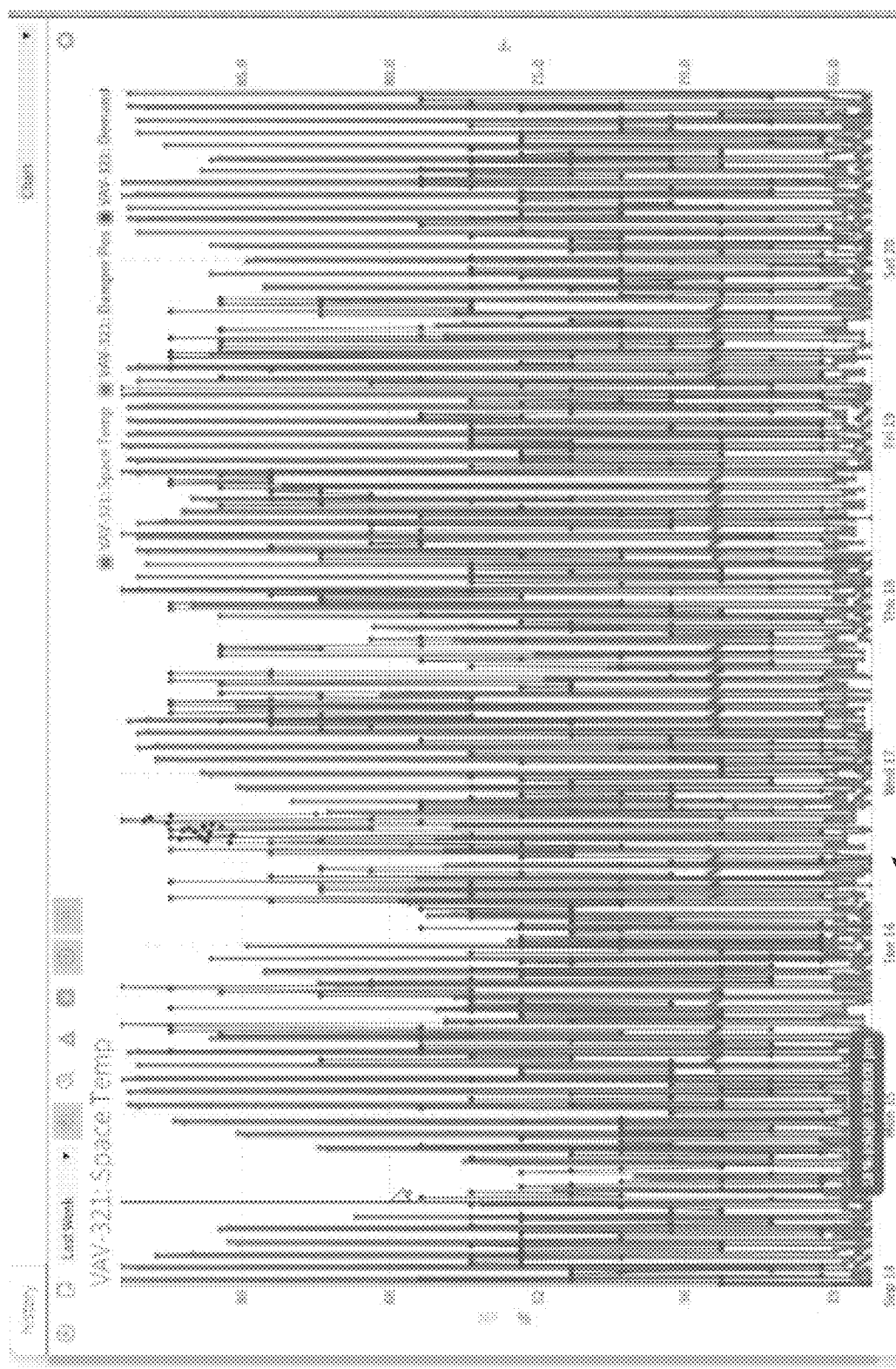
FIG. 2 is a diagram of a chart of data sources as selected from the tree in in FIG. 1.

In FIG. 1 and FIG. 2, there is information about an example VAV controller, with numerous different data sources, as indicated by reference numeral 33, that may be been dragged from a navigation tree 31 onto a chart 32. Navigation tree 31 and chart 32 may be shown on one screen with tree 31 perhaps to one side. Tree 31 and chart 32 are shown separately in FIG. 1 and FIG. 2, respectively, for improved clarity. Since the data sources appear to be too many on chart 32 to visualize at once, all but, for example, the space temperature, damper position and demand may be removed. Chart 32 is one example of many way for displaying data from multiple sources. The charts may be bar, circular and other kinds presentations of data. Various color schemes may be utilized in the charts.

Figure 3:
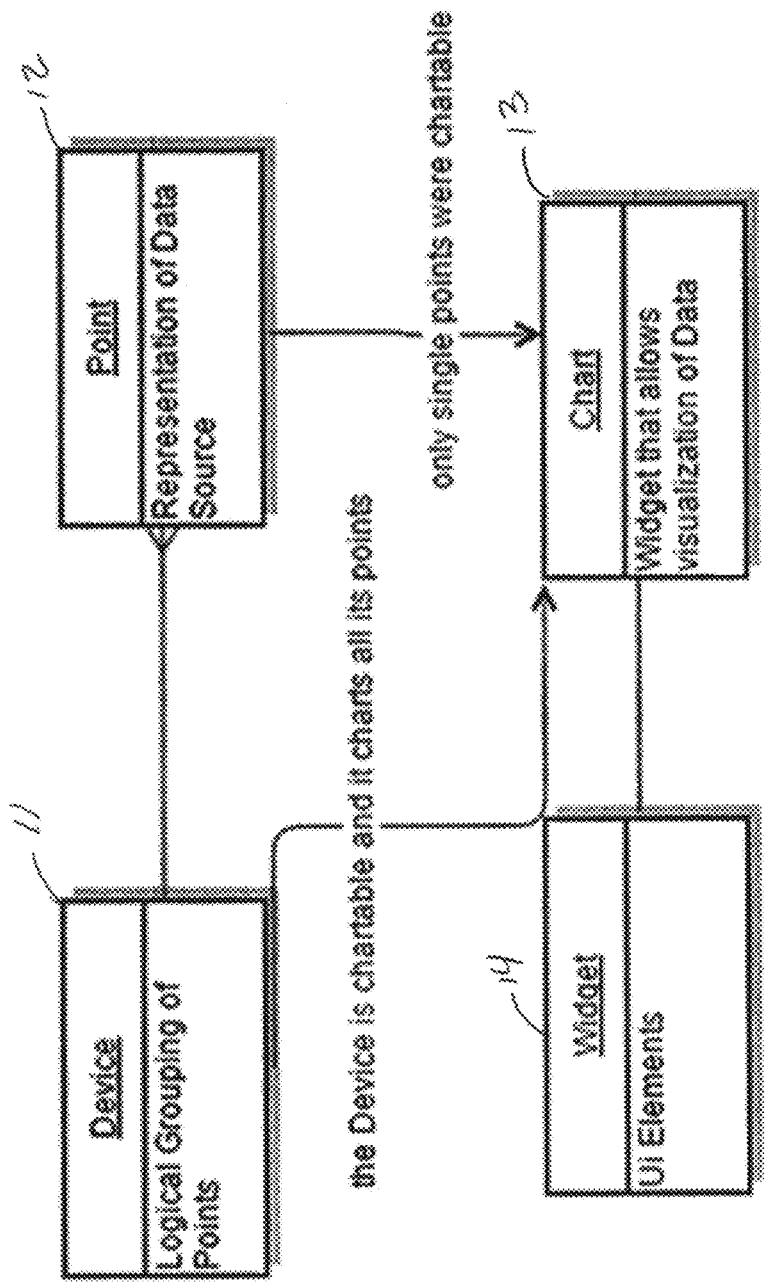
FIG. 3 is a component diagram of couple systems and approaches for visualization historical data from multiple sources.

Folders of points may be chartable. FIG. 3 is a component diagram of couple systems and approaches. A device may be noted as a logical grouping of points in symbol 11. A point, as a representation of a data source, may be shown in symbol 12 and be moved onto a chart at symbol 13 to be plotted. In this path, just single points may be chartable. In another path, a device with a logical grouping of points at symbol 11 may be moved on to the chart in symbol 13. Here the device is chartable and all of its points may be charted at once. A connection between a widget having user interface elements at symbol 14 and the chart at symbol 13 may permit a widget that allows a visualization of the data.

A device may have multiple sources of historical data. When one wants to chart each of the sources of data, one may have to add each of the sources one by one, which could require a repetitive motion of clicking various sources under the same device to see the multiple sources at once.

Figure 4:
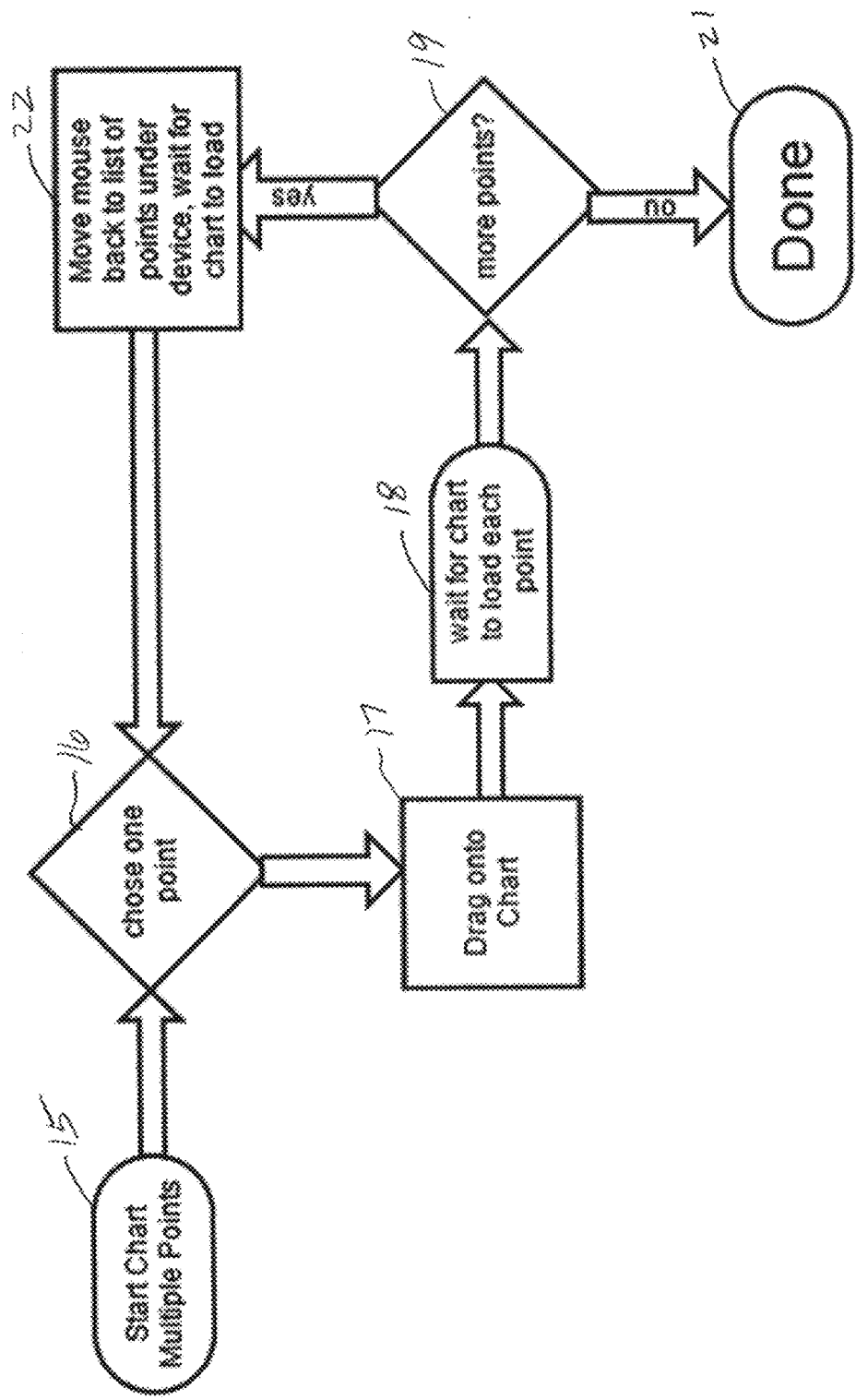
FIG. 4 is a diagram illustrating an approach for downloading and charting data from multiple sources.

FIG. 4 is a flow diagram illustrating one of above noted approaches. A chart of multiple points may start at symbol 15. One point may be chosen at symbol 16 and dragged onto a chart at symbol 17. Then there may be a wait for the chart to load each point at symbol 18. Then at symbol 19, a question of whether there are more points to load arises. If not, then the loading is done as indicated at symbol 21. If there are more points, then at symbol 22, a mouse may be moved back to the list of points under the device and one may wait for the chart to load.

By permitting an entire device, like a VAV controller, to be dragged onto a chart, one may get a few benefits. One benefit is ease of use in that virtually all of the available sources for a device may be plotted at once and be immediately comparable. Another benefit is no waiting for each source to finish loading before adding another source.

Figure 5:
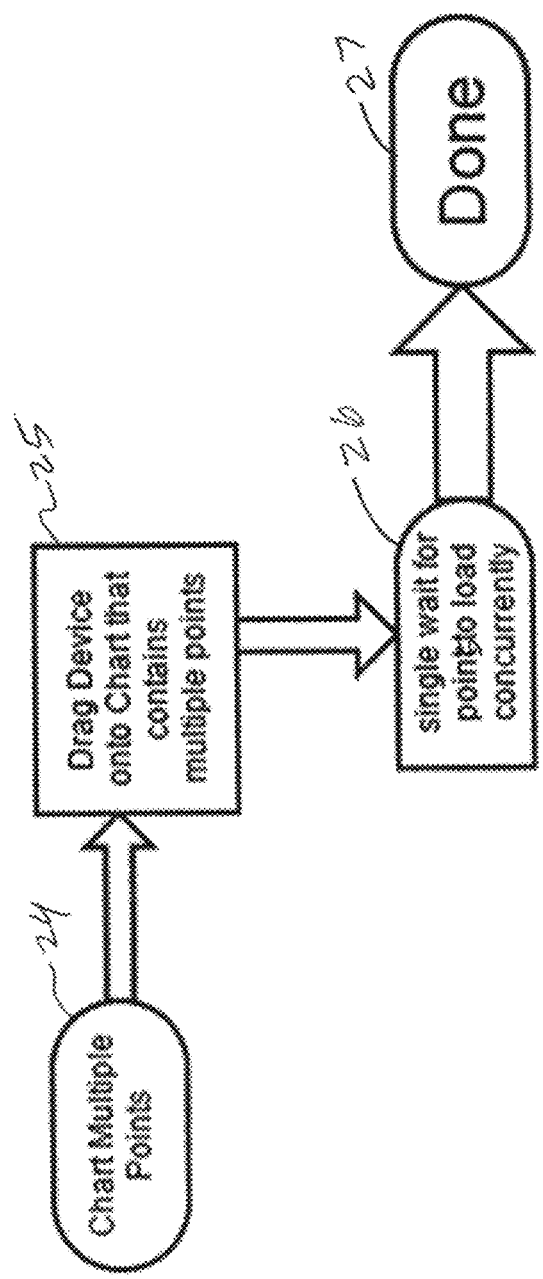
FIG. 5 is a diagram illustrating another approach for downloading and charting data from multiple sources.

FIG. 5 is a flow diagram illustrating the above-noted approach. Multiple points may be charted as indicated at symbol 24. At symbol 25, a device may be dragged on to a chart that contains multiple points. A single wait may be endured for the points to load concurrently on to the chart as indicated at symbol 26. After the single wait, the approach may be done as indicated at symbol 27.

The systems and approaches noted herein may be implemented in Niagara™, such as a Niagara™ 4 data model and tools incorporating a processor and/or controller. The Niagara™ 4 data model and tools may be products of Tridium™, Inc.

To recap, a mechanism for displaying data from multiple sources, may incorporate two or more sources of historical data, a processor having a display that can plot historical data on a chart, and a display connected to the processor for showing the chart in a screen. A navigation tree having a network of devices may be revealed in the screen alongside the chart. A cursor, controllable by a user, may be clicked on a device, revealed in the navigation tree, and dragged onto the chart upon which virtually all of the historical data from sources of the device may be shown as a plot or table on the chart. The historical data on the chart from one or more sources may be removed or hidden from view on the chart so as to have historical data of one or more sources remaining as a plot or table on the chart.

A device on the navigation tree may have sources of historical data of the device listed on the navigation tree. The cursor may be clicked on a source of historical data for the device and dragged onto the chart to be downloaded and revealed as the historical data of the source on the chart as a graphical plot or a table.

An additional source of historical data may be clicked on and dragged onto the chart before a downloading of historical data from a previously clicked on and dragged source has been completed.

Plots of historical data from two or more sources may be virtually immediately comparable after selection and dragging the device from a navigation tree onto the chart.

The cursor may be clicked on a second device revealed in the navigation tree and dragged onto the chart upon which virtually all of the historical data from the sources of the second device may be shown as a plot or a table on the chart.

The plot or table of the historical data from the sources of the second device may automatically remove or hide the plot or table of the historical data from the sources of a previous device.

The plot or table of the historical data from the sources of the second device may be shown on the chart in addition to the plot or table of the historical data from the sources of a previous device.

An approach for displaying data of a device, may incorporate obtaining data from two or more sources of the device, storing the data from the two or more sources in a memory connected to a processor, plotting the data from each of the two or more sources on a chart with the processor, and displaying the chart on a screen generated by the processor. The chart may reveal data plotted from the two or more sources. A navigation tree may be displayed on the screen that shows two or more devices. Another device may be dragged from the navigation tree to the chart on the screen to reveal data plotted from one or more sources of the other device.

The data of the original device may be replaced by the data of the other device.

The data of the other device may be displayed alongside of the data of the original device on the chart.

Data of the one or more sources of the device may be removed or hidden from the chart.

Data of one or more sources of the device may be added to the chart before a loading another source has been completed.

Plots of the two or more sources may be virtually immediately comparable.

The navigation tree on the screen may display icons of the sources under the icon of the device. One or more icons of a source may be dragged onto the chart to display data from the source.

Data behind the plots on the chart may be displayed in a digital numerical fashion with placement of a cursor on a desired portion of the plot in the chart on the screen.

The data of the one or more sources may be historical.

A system for getting device data for a plot may incorporate a device, two or more sources of historical data available for the device, and a processor having a display that has a capability to plot historical data from a source on a chart shown on the display. The display may show a navigation tree listing a network of devices. A device may be dragged from the navigation tree to the chart to reveal virtually all of the two or more sources of historical data available for the device.

The two or more sources may be plotted at once on the chart. Plots of the sources may be virtually immediately viewable. The plots of the sources may be virtually immediately comparable.

An additional source may be added before a loading of a previous source has been completed.

One or more sources may be removed or hidden from the chart.

The device dragged from the navigation tree to the chart may be a component of a heating, ventilation and air conditioning system. The two or more sources of the component may incorporate historical data of parameters of the component of the heating, ventilation and air conditioning unit. One or more sources of the component of the heating, ventilation and air conditioning unit, may be selected for removal from the chart.

The component of the heating, ventilation and air conditioning system may be a variable air volume controller. The two or more sources may incorporate historical data of parameters of the component of the heating, ventilation and air conditioning unit. The two or more sources may incorporate box flow, daily consumption, damper position, demand, power, reheat, space temperature, supply temperature and weekly consumption. One or more sources may be selected for removal from a group consisting of box flow, daily consumption, damper position, demand, power, reheat, space temperature, supply temperature and weekly consumption.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mechanism for displaying data from multiple sources, comprising:
    two or more different remote sources of historical data;
    a processor having a display that can plot the historical data on a chart; and
    a display connected to the processor for showing the chart in a screen; and
    wherein:
    a navigation tree having a network of devices can be revealed in the screen alongside the chart;

a cursor, controllable by a user, can be clicked on a device associated with the two or more different remote sources of historical data, revealed in the navigation tree, and dragged onto the chart upon which the processor accesses virtually all of the historical data from the two or more different remote sources associated with the device and shows the historical data as a plot or table on the chart; and the historical data on the chart from one or more of the different remote sources associated with the device can be removed or hidden from view on the chart so as to have historical data of one or more sources remaining as a plot or table on the chart.

2. The mechanism of claim 1, wherein:

a device on the navigation tree can have the two or more different remote sources of historical data of the device listed on the navigation tree; and the cursor can be clicked on a remote source of historical data for the device and dragged onto the chart to be downloaded and revealed as the historical data of the source on the chart as a graphical plot or a table.

3. The mechanism of claim 2, wherein an additional remote source of historical data can be clicked on and dragged onto the chart before a downloading of historical data from a different previously clicked on and dragged remote source has been completed.

4. The mechanism of claim 1, wherein plots of historical data from the two or more different remote sources are virtually immediately comparable after selection and dragging the device from a navigation tree onto the chart.

5. The mechanism of claim 1, wherein the cursor can be clicked on a second device revealed in the navigation tree and dragged onto the chart upon which virtually all of the historical data from the different remote sources of the second device are shown as a plot or a table on the chart.

6. The mechanism of claim 5, wherein the plot or table of the historical data from the different remote sources of the second device can automatically remove or hide the plot or table of the historical data from the different remote sources of a previous device.

7. The mechanism of claim 5, wherein the plot or table of the historical data from the different remote sources of the second device can be shown on the chart in addition to the plot or table of the historical data from the different remote sources of a previous device.

8. A method for displaying data of a device, comprising:

obtaining data from two or more different remote sources of the device;

storing the data from the two or more different remote sources in a memory connected to a processor;

plotting the data from each of the two or more different remote sources on a chart with the processor; and displaying the chart on a screen generated by the processor; and wherein:

the chart reveals data plotted from the two or more different remote sources;

a navigation tree is displayed on the screen that shows two or more devices; and another device can be dragged from the navigation tree to the chart on the screen to reveal data plotted from one or more different remote sources of the other device.

9. The method of claim 8, wherein the data of the original device are replaced by the data of the other device.

10. The method of claim 8, wherein the data of the other device are displayed alongside of the data of the original device on the chart.

11. The method of claim 8, wherein data of one or more different remote sources of the device can be removed or hidden from the chart.

12. The method of claim 8, wherein data of one or more different remote sources of the device can be added to the chart before a loading another different remote source has been completed.

13. The method of claim 8, wherein plots of the two or more sources are virtually immediately comparable.

14. The method of claim 8, wherein:

the navigation tree on the screen can display icons of the sources under the icon of the device; and one or more icons of a remote source can be dragged onto the chart to display data from the remote source.

15. The method of claim 13, wherein data behind the plots on the chart can be displayed in a digital numerical fashion with placement of a cursor on a desired portion of the plot in the chart on the screen.

16. The method of claim 13, wherein the data of the one or more sources are historical.

17. A system for getting device data for a plot comprising:

a device;

two or more different remote sources of historical data available for the device; and a processor having a display that has a capability to plot historical data from a remote source on a chart shown on the display; and wherein:

the display shows a navigation tree listing a network of devices; and a device can be dragged from the navigation tree to the chart to reveal virtually all of the two or more different remote sources of historical data available for the device.

18. The system of claim 17, wherein the two or more different remote sources are plotted at once on the chart.

19. The system of claim 18, wherein plots of the different remote sources are virtually immediately viewable.

20. The system of claim 19, wherein the plots of the different remote sources are virtually immediately comparable.

21. The system of claim 17, wherein an additional remote source can be added before a loading of a previous remote source has been completed.

22. The system of claim 17, one or more different remote sources can be removed or hidden from the chart.

23. The system of claim 17, wherein:

the device dragged from the navigation tree to the chart is a component of a heating, ventilation and air conditioning system;

the two or more different remote sources of the component comprise historical data of parameters of the component of the heating, ventilation and air conditioning unit; and one or more different remote sources of the component of the heating, ventilation and air conditioning unit, can be selected for removal from the chart.

24. The system of claim 23, wherein:

the component of the heating, ventilation and air conditioning system is a variable air volume controller;

the two or more different remote sources comprise historical data of parameters of the component of the heating, ventilation and air conditioning unit; and one or more different remote sources can be selected for removal from a group consisting of box flow, daily consumption, damper position, demand, power, reheat, space temperature, supply temperature and weekly consumption.

\* \* \* \* \*